(12) United States Patent
Li et al.

(10) Patent No.: US 9,528,034 B2
(45) Date of Patent: Dec. 27, 2016

(54) CYANOACRYLATE COMPOSITIONS

(71) Applicant: Henkel IP & Holding GmbH, Duesseldorf (DE)

(72) Inventors: Ling Li, Glastonbury, CT (US); Joseph B. Schulz, Newington, CT (US); Zheng Lu, South Glastonbury, CT (US); Andrew Scott, Southwick, MA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 0 days.

(21) Appl. No.: 14/867,132

(22) Filed: Sep. 28, 2015

(65) Prior Publication Data

US 2016/0017189 A1    Jan. 21, 2016

Related U.S. Application Data

(63) Continuation of application No. PCT/US2014/038797, filed on May 20, 2014.

(60) Provisional application No. 61/825,766, filed on May 21, 2013.

(51) Int. Cl.
| | | |
|---|---|---|
| *C09J 133/14* | (2006.01) | |
| *C08K 5/11* | (2006.01) | |
| *C08F 222/32* | (2006.01) | |
| *C09J 4/00* | (2006.01) | |
| *C08K 5/00* | (2006.01) | |
| *C08L 3/02* | (2006.01) | |

(52) U.S. Cl.
CPC ............ *C09J 133/14* (2013.01); *C08F 222/32* (2013.01); *C08K 5/0008* (2013.01); *C08K 5/11* (2013.01); *C08L 3/02* (2013.01); *C09J 4/00* (2013.01)

(58) Field of Classification Search
CPC .................................. C09J 133/14; C08K 5/11
USPC ....................................................... 156/331.6
See application file for complete search history.

(56) References Cited

U.S. PATENT DOCUMENTS

| | | |
|---|---|---|
| 2,776,232 A | 1/1957 | Shearer et al. |
| 2,784,127 A | 3/1957 | Joyner et al. |
| 2,784,215 A | 3/1957 | Joyner |
| 3,699,127 A | 10/1972 | O'Sullivan et al. |
| 3,961,966 A | 6/1976 | Brinkmann et al. |
| 4,364,876 A | 12/1982 | Kimura et al. |
| 4,444,933 A | 4/1984 | Columbus et al. |
| 4,556,700 A | 12/1985 | Harris et al. |
| 4,622,414 A | 11/1986 | McKervey |
| 4,636,539 A | 1/1987 | Harris et al. |
| 4,695,615 A | 9/1987 | Leonard et al. |
| 4,718,966 A | 1/1988 | Harris et al. |
| 4,837,260 A | 6/1989 | Sato et al. |
| 4,855,461 A | 8/1989 | Harris |
| 4,906,317 A | 3/1990 | Liu |
| 5,312,864 A | 5/1994 | Wenz et al. |
| 5,530,037 A | 6/1996 | McDonnell et al. |
| 6,607,632 B1 | 8/2003 | McDonnell et al. |
| 6,977,278 B1 | 12/2005 | Misiak |
| 2006/0094833 A1* | 5/2006 | McDonnell .............. C09D 4/00 525/452 |
| 2011/0251318 A1* | 10/2011 | Ishizaki .................... C09J 4/00 524/208 |
| 2012/0255461 A1* | 10/2012 | Nishino ................ C07C 255/08 106/287.25 |

OTHER PUBLICATIONS

G.H. Millet, "Cyanoacrylate Adhesives" in Structural Adhesives: Chemistry and Technology, S.R. Hartshorn, ed., Plenun Press, New York, p. 249-307 (1986).
H.V. Coover, D.W. Dreifus and J.T. O'Connor, "Cyanoacrylate Adhesives" in Handbook of Adhesives, 27, 463-77, I. Skeist, ed., Van Nostrand Reinhold, New York, 3rd ed. (1990).
International Search Report issued in connection with International Patent Application No. PCT/US2014/038797 mailed on Sep. 25, 2014.

\* cited by examiner

*Primary Examiner* — Daniel Lee
(74) *Attorney, Agent, or Firm* — Steven C. Bauman

(57) ABSTRACT

This invention relates to flexible cyanoacrylate-containing compositions, having improved torsion stress resistance particularly when bonded to plastic substrates.

12 Claims, 1 Drawing Sheet

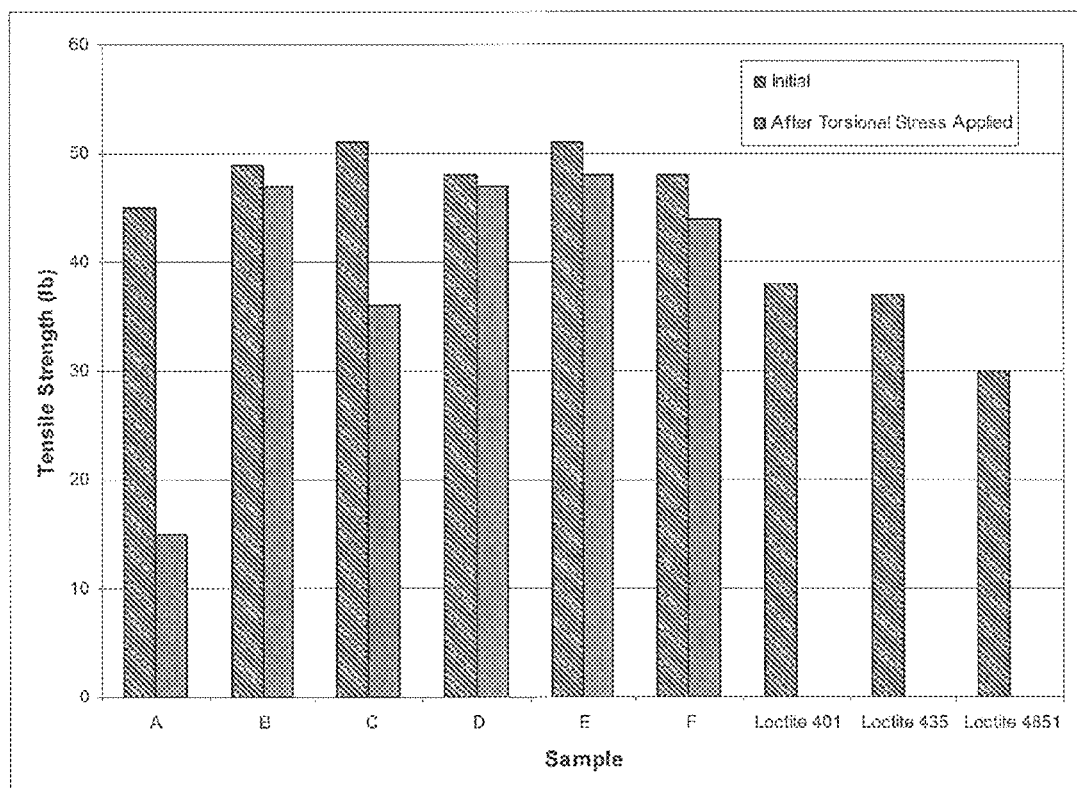

CYANOACRYLATE COMPOSITIONS

BACKGROUND

Field

This indention relates to flexible cyanoacrylate-containing compositions, having improved torsion stress resistance particularly when bonded to plastic substrates.

Brief Description of Related Technology

Cyanoacrylate adhesive compositions are well known, and widely used as quick setting, instant adhesives with a wide variety of uses. See; H. V. Coover, D. W. Dreifus and J. T. O'Connor, "Cyanoacrylate Adhesives" in *Handbook of Adhesives*, 27, 463-77, I. Skeist, ed., Van Nostrand Reinhold, New York, 3rd ed. (1990). See also G. H. Millet, "Cyanoacrylate Adhesives" in *Structural Adhesives: Chemistry and Technology*, S. R. Hartshorn, ed., Plenun Press, New York, p. 249-307 (1986).

Cyanoacrylate compositions ordinarily tend to cure to form relatively brittle polymeric materials. This is an undesirable property for certain applications where a degree of flexibility in the polymeric material is desired. Such applications include bonding flexible materials where a degree of flexibility in the bond to match the flexibility of the material is desired. It is also desirable to have a flexible polymeric material in applications where the polymeric material may be subjected to varying forces in its end-use application. For example if the polymeric material has bonded together two substrates, the substrates may not remain in an undisturbed condition but may be subject to external forces, for example where the substrates, form part of a moving object, or part of a stationary object which is subjected to one or more continuous or occasional forces from other moving objects.

In the past, efforts have been made to improve the flexibility of cured products of cyanoacrylate compositions. See e.g. U.S. Pat. Nos. 2,776,232, 2,784,215, 2,784,127, 3,699,127, 3,961,966, 4,364,876, and 4,444,933.

One approach to overcoming the brittleness of polymerized cyanoacrylate adhesives has been to plasticize the composition through the use of monomer mixtures. The use of mixtures of cyanoacrylate monomers is thought to result in a more flexible polymeric material when the monomer mixture is cured. A second approach has been to incorporate plasticizers into cyanoacrylate compositions. The flexibility here is generally obtained at the expense of cure speed and/or bond strength.

U.S. Pat. No. 6,977,278 describes certain cyanoacrylate compositions comprising: (i) at least one lower cyanoacrylate monomer component selected from ethyl cyanoacrylate and methoxycyanoacrylate; (ii) at least one higher cyanoacrylate monomer component in an amount greater than 12% by weight based on the total weight of the combination, of the lower cyanoacrylate monomer and the higher cyanoacrylate monomer, and selected from n-propyl-cyanoacrylate, iso-propyl cyanoacrylate, n-butylcyanoacruylate, sec-butyl-cyanoacrylate, iso-butyl-cyanoacrylate, tert-butyl-cyanoacrylate, n-pentyl-cyanoacrylate, 1-methyl-butyl-cyanoacrylate, 1-ethyl-propyl-cyanoacrylate, neopentyl-cyanoacrylate, n-hexyl-cyanoacrylate, 1-methyl pentyl-cyanoacrylate, n-heptyl-cyanoacrylate, n-octyl-cyanoacrylate, n-nonyl-cyanoacrylate, n-decyl-cyanoacrylate, n-undecyl-cyanoacrylate, n-dodecyl-cyanoacrylate, cyclohexyl-cyanoacrylate, benzyl-cyanoacrylate, phenyl-cyanoacrylate, tetrahydrofurfuryl-cyanoacrylate, allyl cyanoacrylate, propargyl-cyanoacrylate, S-butenyl-cyanoacrylate, phenethyl-cyanoacrylate, chloropropyl-cyanoacrylate, ethoxyethyl-cyanoacrylate, ethoxypropyl-cyanoacrylate, ethoxy isopropyl-cyanoacrylate, propoxyethyl-cyanoacrylate, isopropoxyethyl-cyanoacrylate, butoxyethyl-cyanoacrylate, methoxypropyl-cyanoaorylate, methoxy isopropyl-cyanoacrylate, methoxy butyl-cyanoacrylate, propoxymethyl-cyanoacrylate, propoxy ethyl-cyanoacrylate, propoxy propyl-cyanoacrylate, butoxymethyl-cyanoacrylate, butoxyethyl-cyanoacrylate, butoxypropyl-cyanoacrylate, butoxyisopropyl-cyanoacrylate, butoxy butyl-cyanoacrylate, iso-nonyl-cyanoacrylate, iso-decyl-cyanoacrylate, cyclohexyl methyl-cyanoacrylate, naphtyl-cyanoacrylate, 2-(2'-methoxy)-ethoxy-ethyl-cyanoacrylate, 2-(2'-ethoxy)-ethoxy ethyl-cyanoacrylate, 2-(2'-propyloxy)-ethoxy ethyl-cyanoacrylate, 2-(2'-butyloxy)-ethoxy ethyl-cyanoacrylate, 2-(2'-pentyloxy)-ethoxy ethyl-cyanoacrylate, 2-(2'-hexyloxy)-ethoxy ethyl-cyanoacrylate, 2-(2-methoxy)-propyloxy propyl-cyanoacrylate, 2-(2'-ethoxy)-propyloxy propyl-cyanoacrylate, 2-(2'-propyloxy)-propyloxy propyl-cyanoacrylate, 2-(2'-pentyloxy)-propyloxy propyl-cyanoacrylate, 2-(2'-hexyloxy)-propyloxy propyl-cyanoacrylate, 2-(2'-methoxy)-butyloxy butylcyanoacrylate, 2-(2'-ethoxy)-butyloxy butyl-cyanoacrylate, 2-(2'-butyloxy)-butyloxy butyl-cyanoacrylate, 2-(3'-methoxy)-propyloxy ethyl-cyanoacrylate, 2-(3'-methoxy)-butyloxy ethyl-cyanoacrylate, 2-(3'-methoxy)-pxopyloxy propyl-cyanoacrylate, 2-(3'-methoxy)-butyloxy propyl-cyanoacrylate, 2-(2'-methoxy)-ethoxy propyl-cyanoacrylate, and 2-(2'-methoxy)-ethoxy, butyl-cyanoacrylate; (iii) at least one plasticizer component comprising at least one ester group containing plasticizer, the plasticizer component being miscible in a mixture of component (i) and component (ii); the plasticizer component being present in the composition in an amount between about 15 to about 40% by weight of the composition, and the plasticizer component having an Ap/Po ratio in the range of about 1 to less than about 6, provided the plasticizer component does not include pentaerythritoltetrabenzoate as the sole plasticizer.

The '273 patent makes clear that amounts of plasticizer up to 12 weight percent do not result in the desired properties and very high amounts of plasticizer deleteriously affect cure speeds and bond strength so that it appears that the desired flexibility can be achieved in the cured compositions if amounts less than about 40 weight percent are used.

Despite these efforts, there has been a long standing, but unmet, desire to achieve a cyanoacrylate showing more robust bond strength while maintaining a degree of flexibility. It would accordingly be quite advantageous to provide a solution to that desire.

The present invention remedies the shortcomings of compromised bond strength when improvements to flexibility in cyanoacrylate compositions has been achieved, by providing cyanoacrylate-containing compositions, having improved torsion stress resistance particularly when bonded to plastic substrates.

More specifically, provided herein are cyanoacrylate-containing compositions having a cyanoacrylate component based on the combination of ethyl-2-cyanoacrylate and octyl-2-cyanoacrylate, together with about 5 weight percent to about 12 weight percent of acetyl triacetyl citrate.

In addition, provided herein is a method of bonding together plastic substrates using cyanoacrylate compositions, which when subjected to torsional strain, show improved performance. Indeed, the performance is so improved that substrate failure is observed rather than either adhesive or cohesive failure of the cured cyanoacrylate composition/substrate interface.

The method involves providing a cyanoacrylate-containing composition having a cyanoacrylate component based on the combination of ethyl-2-cyanoacrylate and octyl-2-cyanoacrylate, together with about 5 weight percent to about 12 weight percent of acetyl triacetyl citrate; providing one or more plastic parts to be bonded together; and applying the cyanoacrylate-containing composition to at least a portion of a surface of the part(s) to be bonded and maintaining the cyanoacrylate-containing composition applied part for a period of time sufficient to form a bond.

In addition, the present invention is directed to reaction products of the inventive compositions.

Also, the invention is directed to a method of preparing the inventive compositions.

The invention will be more fully understood by a reading of the section entitled "Detailed Description", which follows.

BRIEF DESCRIPTION OF THE FIGURE

FIG. 1 shows an X-Y plot of tensile strength of a tubing/fitting assembly using cyanoacrylate compositions shown in Tables 1 and 2, before and after torsional stress applied in terms of 40 rpm.

DETAILED DESCRIPTION

As noted above, this invention is directed to a cyanoacrylate-containing composition, which when cured provides improved torsion stress resistance particularly when bonded to plastic substrates.

The cyanoacrylate component includes the combination of ethyl-2-cyanoacrylate and octyl-2-cyanoacrylate. The relative amount of the octyl cyanoacrylate is about 15 weight percent to about 50 weight percent, such as about 20 weight percent to about 45 weight percent, desirably about 28 weight percent to about 44 weight percent. The ethyl cyanoacrylate should be used as the balance of the cyanoacrylate component.

The cyanoacrylate component should be included in the compositions in an amount within the range or from greater than about 85 weight, percent to about 95 weight percent, with the range of about 30 weight percent to about 93 weight percent, of the total composition being desirable.

The acetyl triethyl citrate should be used in an amount of about 5 weight percent to less than about 1.5 weight percent, such as about 5 to about 12 weight percent.

The octyl cyanoacrylate and acetyl triethyl citrate together should be included in the compositions in an amount within the range of from about 30 weight percent to about 65 weight percent, such as about 40 weight percent to about 55 weight percent.

Accelerators may also be included in the inventive cyanoacrylate compositions, such as any one or more selected from calixarenes and oxacalixarenes, silacrowns, crown ethers, cyclodextrins, poly(ethyleneglycol) di(meth), acrylates, ethoxylated hydric compounds and combinations thereof.

Of the calixarenes and oxacalixarenes, many are known and are reported in the patent literature. See e.g. U.S. Pat. Nos. 4,556,700, 4,622,414, 4,636,539, 4,695,615, 4,718, 966, and 4,855,461, the disclosures of each of which are hereby expressly incorporated herein by reference.

For instance, as regards calixarenes, those within the following structure are useful herein:

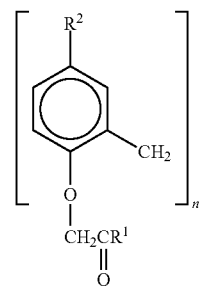

where $R^1$ is alkyl, alkoxy, substituted alkyl or substituted alkoxy; $R^2$ is H or alkyl; and n is 4, 6 or 8.

One particularly desirable calixarene is tetrabutyl. tetra [2-ethoxy-2-oxoethoxy]calix-4-arene.

A host of crown ethers are known. For instance, examples which may be used herein either individually or in combination, include 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methylbenzo-18-crown-6, 1,2-t-butyl-18-crown-6, 1,2-vinylbenzo-15-crown-5, 1,2-vinylbenzo-18-crown-6, 1,2-t-butyl-cyclohexyl-18-crown-6, asym-dibenzo-22-crown-6 and 1,2-benzo-1,4-benzo-5-oxygen-20-crown-7. See U.S. Pat. No. 4,837,260 (Sato), the disclosure of which is hereby expressly incorporated herein by reference.

Of the silacrowns, again many are known, and are reported in the literature.

Specific examples of silacrown compounds useful in the incentive compositions include:

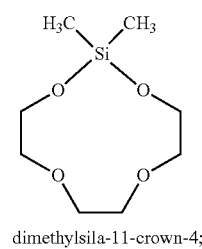

dimethylsila-11-crown-4;

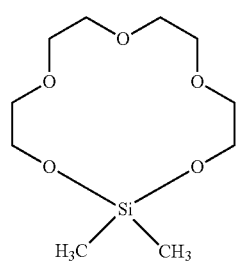

dimethylsila-14-crown-5; and

-continued

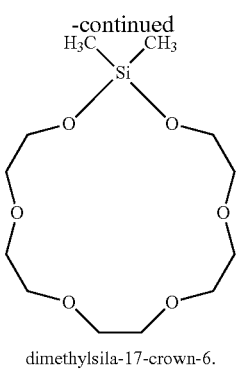

dimethylsila-17-crown-6.

See e.g. U.S. Pat. No. 4,906,317 (Liu), the disclosure of which is hereby expressly incorporated herein by reference.

Many cyclodextrins may be used in connection with the present invention. For instance, those described and claimed in U.S. Pat. No. 5,312,864 (Wenz), the disclosure of which is hereby expressly incorporated herein, by reference, as hydroxyl group derivatives of an α,β or γ-cyclodextrin would be appropriate choices as an accelerator component.

For instance, poly(ethylene glycol) di(meth)acrylates suitable for use herein include those within the following structure:

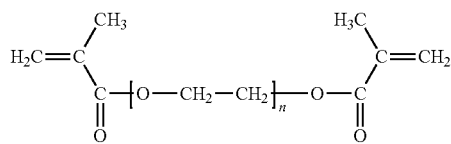

where n is greater than 3, such as within the range of 3 to 12, with n being 9 as particularly desirable. More specific examples include PEG 200 DMA, (where n is about 4) PEG 400 DMA (where n is about 9), PEG 600 DMA (where n is about 14), and PEG 800 DMA (where n is about 19), where the number (e.g., 400) represents the average molecular weight of the glycol portion of the molecule, excluding the two methacrylate groups, expressed as grams/mole (i.e., 400 g/mol). A particularly desirable PEG DMA is PEG 400 DMA.

And of the ethoxylated hydric compounds (or ethoxylated fatty alcohols that may be employed), appropriate ones may be chosen from those within the following structure;

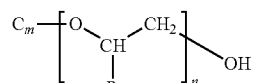

where $C_m$ can be a linear or branched alkyl or alkenyl chain, m is an integer between 1 to 30, such as from 5 to 20, n is an integer between 2 to 30, such as from 5 to 15, and R may be H or alkyl, such as $C_{1-6}$ alkyl.

When used, the accelerator embraced by the above structures should be included in the compositions in an amount within the range of from about 0.01 weight percent to about 10 weight percent, with the range of about 0.1 weight percent to about 0.5 weight percent being desirable, and about 0.4 weight percent of the total composition being particularly desirable.

A stabilizer package is also ordinarily found in cyanoacrylate compositions. The stabilizer package may include one or more free radical stabilizers and anionic stabilizers, each of the identity and amount of which are well known to those of ordinary skill in the art. See e.g. U.S. Pat. Nos. 5,530,037 and 6,607,632, the disclosures of each of which are incorporated herein by reference.

Other additives may be included in the inventive cyanoacrylate compositions, such as certain acidic materials (like citric acid), thixotropy or gelling agents, thickeners, dyes, and combinations thereof.

In another aspect of the invention, there is provided a method of bonding together two substrates, which method includes applying to at least one of the substrates a composition as described above, and thereafter mating together the substrates for a time sufficient to permit the adhesive to fixture. For many applications, the substrate should become fixed by the inventive compositions in less than about 150 seconds, and depending on the substrate as little as about 30 seconds.

In yet another aspect of the invention there are provided cured products of the so-described compositions.

The invention, will be further illustrated by the examples which follow.

EXAMPLES

Formulations

Cyanoacrylate compositions were prepared from the constituents noted in Table 1 below in the amounts recorded. For comparative purpose, LOCTITE 401, LOCTITE 435 and LOCTITE 4851 were also included in the Table.

TABLE 1

| Constituents | | | | | | | | Sample/Amt. (wt %) | | | |
| --- | --- | --- | --- | --- | --- | --- | --- | --- | --- | --- | --- |
| Type | Identity | A | B | C | D | E | F | Loctite 401 | Loctite 435* | Loctite 4851 |
| Cyanoacrylate | Ethyl CA | Bal. | Bal. | Bal. | Bal. | Bal. | Bal. | 60-100 | 60-100 | 30-60 |
|  | Octyl CA | 24 | 44 | 64 | 36 | 28 | 18.4 |  |  |  |
|  | Butyl CA |  |  |  |  |  |  |  |  | 10-30 |
| Plasticizer | Acetyl triethyl citrate | 5 | 5 | 5 | 10 | 15 | 25 |  |  | 25 |
| Accelator | 18-Crown-6 | 0.2 | 0.2 | 0.2 | 0.2 | 0.2 | 0.2 |  |  |  |
| Stabilizer | BF$_3$ (ppm) | 25 | 25 | 25 | 25 | 25 | 25 |  |  |  |
| Thickener |  |  |  |  |  |  |  | 5-10 | 5-10 | 5-10 |

*Rubber toughened, with improved stability and peel strength

Each of Samples A-F, LOCTITE 401, LOCTITE 435 AND LOCTITE 4851 was applied to a tube constructed from PVC and a plastic connector (i.e., polyvinyl chloride, polycarbonate, or ABS) was attached thereto. The bonded assemblies were allowed to cure for a minimum 24 hours at room temperature before being tested.

Pressure testing was performed on a bonded tube/connector assembly for leaks (immersing the assembly into water to observe any bubbling under a pressure of about 20 psi condition). Pull testing was evaluated before and after a torsional stress is applied on the assembly. The resulting tensile strength was measured using an Instron instrument. Torsional stress was completed by using the assembly attached to a chuck, which makes operational turns at 40 rpm for 15 seconds.

Referring below to Table 2, the PVC tube/PVC connector assemblies bonded with Samples A and C failed the pressure testing after torsional stress was applied, indicating leaks were observed. Leaks were also observed for the assemblies bonded by the three commercial controls, before and after torsional stress was applied. The assemblies bonded by Samples B, D, E and F passed the pressure testing for leaks. In addition, better tensile strength (before and after stress was applied) was observed for the assemblies bonded by Samples B, D and E, as compared to the three commercial controls and other formulations. See also FIG. 1 for bar chart depictions of tensile strength of a selection of these samples. The failure mode after the pulling test is recorded in Table 2.

temperature of about 60° C. for the time noted, after which the tensile strength was determined by placing a force on opposite ends of the assembly to try to pull the constituent components apart in a lateral manner.

As may be seen below in Table 3, the strength retained for Samples B, D and E between the initial measurement and the measurement after each of 3 weeks and 6 weeks of heat aging at 60° C. show a remarkable increase as compared with the strength retained for Sample F after the same heat aging evaluation. Thus, while Sample F performed admirably, under aging conditions adhesive failure was observed.

TABLE 3

| PVC Tubing/ | Sample | | | |
|---|---|---|---|---|
| PVC Connector | B | D | E | F |
| Tensile strength (lbs.) Initial | 49 | 48 | 51 | 48 |
| Aged at 60° C. for 3 weeks | 50 | 49 | 47 | 25 |
| Aged at 60° C. for 6 weeks | 47 | 48 | 47 | 20 |
| Failure mode (aged samples) | Substrate failure | Substrate failure | Substrate failure | Adhesion Failure |

Tables 4 and 5 below show the pressure test and pulling test results formed on PVC tube/PC connector and PVC

TABLE 2

| PVC Tubing/PVC Connector | Sample | | | | | | | | |
|---|---|---|---|---|---|---|---|---|---|
| | A | B | C | D | E | F | Loctite 401 | Loctite 435 | Loctite 4851 |
| Pressure Test Initial | Pass | Pass | Pass | Pass | Pass | Pass | Fail/Pass | Fail/Pass | Fail/Pass |
| After Torsional Stress Applied | Fail | Pass | Fail | Pass | Pass | Pass | Fail | Fail | Fail |
| Tensile strength (lbs.) Initial | 45 | 49 | 51 | 48 | 51 | 48 | 38 | 37 | 30 |
| After Torsional Stress Applied | 15 | 47 | 36 | 47 | 48 | 44 | 0 | 0 | 0 |
| Failed mode | − | + | − | + | + | − | − | − | − |

−: Adhesion failure

+: Substrate failure

Table 3 below shows the tensile strength of aged PVC tube/PVC connector assemblies, where Samples B, D, E and F were used to bond the assemblies. More specifically, and like the samples recorded in Table 2, each of the four samples was applied to a tube constructed from PVC and a connector constructed from PVC was attached thereto. Replicates of five specimens were prepared and evaluated for each sample. One set of the assemblies was exposed to a tubing/ABS connector assemblies, and bonded by using Samples B, C, D and the three commercial controls. The data recorded in Tables 4 and 5 illustrates that excellent tensile strength (both before and after torsional stress was applied) can be obtained by using Samples B and D. Assemblies bonded by using Samples B and D also showed better performance (at least in terms of exhibiting no leaks) during pressure testing, as compared to Sample C and the three commercial controls.

TABLE 4

| PVC Tubing/PC Connector | | B | C | D | Loctite 401 | Loctite 435 | Loctite 4851 |
|---|---|---|---|---|---|---|---|
| Pressure Test | Initial | Pass | Fail | Pass | Fail/Pass | Fail/Pass | Fail/Pass |
| | After Torsional Stress Applied | Pass | Fail | Pass | Fail | Fail | Fail |
| Tensile strength (lbs.) | Initial | 18 | 13 | 20 | 18 | 19 | 17 |
| | After Torsional Stress Applied | 17 | 12 | 18 | 0 | 0 | 0 |
| | Failure mode | Substrate failure | Adh. failure | Substrate failure | Adh. failure | Adh. failure | Adh. failure |

TABLE 5

| PVC Tubing/ABS Connector | | B | C | D | Loctite 401 | Loctite 435 | Loctite 4851 |
|---|---|---|---|---|---|---|---|
| Pressure Test | Initial | Pass | Pass | Pass | Fail/Pass | Fail/Pass | Fail/Pass |
| | After Torsional Stress Applied | Pass | Fail | Pass | Fail | Fail | Fail |
| Tensile strength (lbs.) | Initial | 18 | 17 | 20 | 17 | 20 | 20 |
| | After Torsional Stress Applied | 17 | 16 | 18 | 0 | 0 | 0 |
| | Failure mode | Substrate failure | Adh. failure | Substrate failure | Adh. Failure | Adh. Failure | Adh. failure |

As shown in these examples, the combination of octyl cyanoacrylate and acetyl triethyl citrate in an ethyl cyanoacrylate demonstrates improved torsional stress resistance, particularly when the amount of acetyl triethyl citrate is about 5 weight percent to less than about 15 weight percent, such as about 12 weight percent, and the amount of octyl cyanoacrylate is about 15 weight percent to about 50 weight percent, such as about 20 weight percent to about 45 weight percent.

What is claimed is:

1. A cyanoacrylate composition, comprising:
   (a) a cyanoacrylate component comprising the combination of ethyl-2-cyanoacrylate and about 20 weight percent to about 45 weight percent octyl-2-cyanoacrylate; and
   (b) acetyl triethyl citrate in an amount of from about 5 weight percent to less than about 15 weight percent.

2. The composition according to claim 1, further comprising a stabilizing amount of an acidic stabilizer and a free radical inhibitor.

3. The composition according to claim 1, further comprising an accelerator component.

4. The composition according to claim 3, wherein the accelerator component is selected from the group consisting of calixarene, oxacalixarene, silacrown, cyclodextrin, crown ether, poly(ethyleneglycol) di(meth)acrylate, ethoxylated hydric compound, and combinations thereof.

5. The composition according to claim 4, wherein the crown ether is selected from the group consisting of 15-crown-5, 18-crown-6, dibenzo-18-crown-6, benzo-15-crown-5-dibenzo-24-crown-8, dibenzo-30-crown-10, tribenzo-18-crown-6, asym-dibenzo-22-crown-6, dibenzo-14-crown-4, dicyclohexyl-18-crown-6, dicyclohexyl-24-crown-8, cyclohexyl-12-crown-4, 1,2-decalyl-15-crown-5, 1,2-naphtho-15-crown-5, 3,4,5-naphtyl-16-crown-5, 1,2-methyl-benzo-18-crown-6, 1,2-methylbenzo-5, 6-methyl-benzo-18-crown-6, 8-crown-6, 1,2-vinylbenzo-15-crown-5, 1,2-vinylbenzo-18-crown-6, 1,24-butyl-cyclohexyl-18-crown-6, asym-dibenzo-22-crown-6, and 1,2-benzo-1,4-benzo-5-oxygen-20-crown-7 and combinations thereof.

6. The composition according to claim 1, further comprising additives selected from the group consisting of tougheners, shock resistant additives, thixotropy conferring agents, thickeners, dyes, and combinations thereof.

7. Reaction products of the composition according to claim 1.

8. A method of bonding together two substrates, at least one of which being constructed from a thermoplastic material, comprising the steps of:
   applying a cyanoacrylate-containing composition according to claim 1, to at least one of the substrates and
   mating together the substrates for a time sufficient to permit the adhesive to cure.

9. The composition according to claim 1, wherein the acetyl triethyl citrate is present in an amount of about 5 weight percent to about 12 weight percent.

10. The composition according to claim 1, wherein the octyl cyanoacrylate and acetyl triethyl citrate together are present in an amount within the range of from about 30 weight percent to about 65 weight percent.

11. The composition according to claim 1, wherein the octyl cyanoacrylate and acetyl triethyl citrate together are present in an amount within the range of from about 40 weight percent to about 55 weight percent.

12. A method of conferring improved torsional stress resistance to a cured product of a cyanoacrylate composition, comprising the steps of:
- providing a cyanoacrylate component comprising the combination of ethyl-2-cyanoacrylate and about 20 weight percent to about 45 weight percent octyl-2-cyanoacrylate;
- mixing acetyl triethyl citrate in an amount of from about 5 weight percent to less than about 15 weight percent with the cyanoacrylate component to form a cyanoacrylate composition; and
- providing two or more substrates, at least one of which is constructed of a thermoplastic, wherein the substrates have matable surfaces, whereupon mating the matable surfaces of the substrates with the cyanoacrylate composition disposed therebetween forms an assembly; and
- exposing the assembly to torsional stress.

* * * * *

UNITED STATES PATENT AND TRADEMARK OFFICE
CERTIFICATE OF CORRECTION

| | |
|---|---|
| PATENT NO. | : 9,528,034 B2 |
| APPLICATION NO. | : 14/867132 |
| DATED | : December 27, 2016 |
| INVENTOR(S) | : Ling Li et al. |

It is certified that error appears in the above-identified patent and that said Letters Patent is hereby corrected as shown below:

In the Specification

Column 1, Line 66: Change "S-butenyl-cyanoacrylate" to -- 2-butenyl-cyanoacrylate --.

Column 2, Lines 3 and 4: Change "methoxypropyl-cyanoaorylate" to -- methoxypropyl-cyanoacrylate --.

Column 2, Line 16: Change "2-(2-methoxy)-" to -- 2-(2'-methoxy)- --.

Column 2, Line 48: After "desire" and before "The", insert -- SUMMARY --.

Column 3, Line 42: Change "or" to -- of --.

Column 3, Line 43: After "weight", delete ",".

Column 3, Line 44: Change "30" to -- 90 --.

Column 3, Line 47: Change "1.5" to -- 15 --.

Column 3, Line 58: After "di(meth)", delete ",".

Column 4, Line 17: After "tetrabutyl", delete ".".

Column 4, Line 39: Change "incentive" to -- inventive --.

Column 6, Line 38: After "invention", insert -- , --.

Column 6, Line 40: After "invention", delete ",".

Column 6, Table 1 (column: Type): Change "Accelator" to -- Accelerator --.

Signed and Sealed this
Eighth Day of May, 2018

Andrei Iancu
*Director of the United States Patent and Trademark Office*

CERTIFICATE OF CORRECTION (continued)
U.S. Pat. No. 9,528,034 B2

In the Claims

Column 10, Line 42: Change "8-crown-6" to -- 1,2-t-butyl-18-crown-6 --.

Column 10, Line 43: Change "1, 24-butyl-" to -- 1,2-t-butyl --.

Column 10, Line 53: Change "being" to -- is --.

Column 10, Line 56: After "1", delete ",".